United States Patent
Aigner et al.

(10) Patent No.: US 6,406,933 B1
(45) Date of Patent: Jun. 18, 2002

(54) PRODUCTION METHOD FOR MICROMECHANICAL COMPONENTS

(75) Inventors: Robert Aigner, Munich; Klaus-Günter Oppermann, Holzkirchen; Hergen Kapels, Neubiberg, all of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/708,295

(22) Filed: Nov. 8, 2000

Related U.S. Application Data

(63) Continuation of application No. PCT/DE99/01337, filed on May 4, 1999.

(30) Foreign Application Priority Data

May 8, 1998 (DE) .......................................... 198 20 758

(51) Int. Cl.[7] .............................................. H01L 21/00
(52) U.S. Cl. ...................................................... 438/53
(58) Field of Search ............................. 438/50, 52, 53; 257/414, 415; 361/283.1, 283.3, 283.4

(56) References Cited

U.S. PATENT DOCUMENTS 6,159,762 A * 12/2000 Scheiter et al. ............... 438/53

FOREIGN PATENT DOCUMENTS

DE  43 36 774 A1  5/1995

OTHER PUBLICATIONS

Löfdahl, L. et al.: "Small silicon based pressure transducers for measurements in turbulent boundary layers", Experiments in fluids, vol. 17, Jun. 1994, No. 1/2, pp. 24–31.

* cited by examiner

*Primary Examiner*—Keith Christianson
(74) *Attorney, Agent, or Firm*—Laurence A. Greenberg; Werner H. Stemer; Gregory L. Maybeck

(57) ABSTRACT

Etching openings are provided in a membrane above an etched-out cavity, only at a distance of at most one tenth of the diameter of the member away from the edge of the cavity. For production, a poly layer is applied to a sacrificial layer composed of $SiO_2$ and is provided with rows of etching holes, through which channels are etched out in the sacrificial layer. The poly layer is oxidized and is made smooth by means of a planarization layer. Etching holes are produced in the edge region of the membrane layer. The sacrificial layer is removed over the entire area of the cavity which is to be produced, with the etching medium propagating sufficiently quickly through the channels.

3 Claims, 3 Drawing Sheets

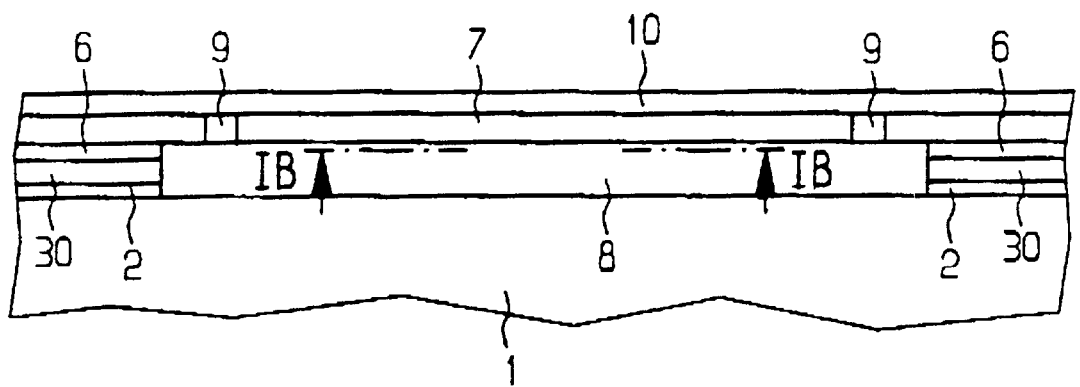
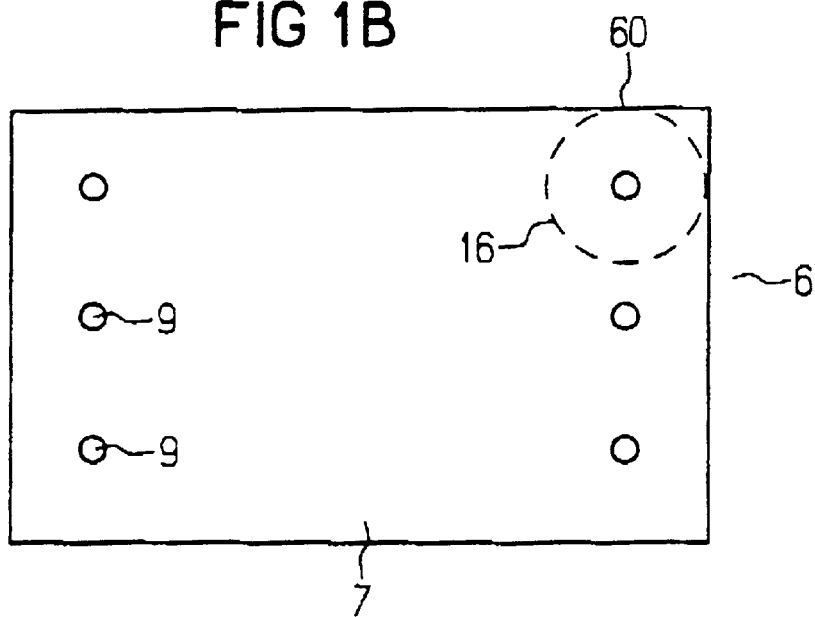

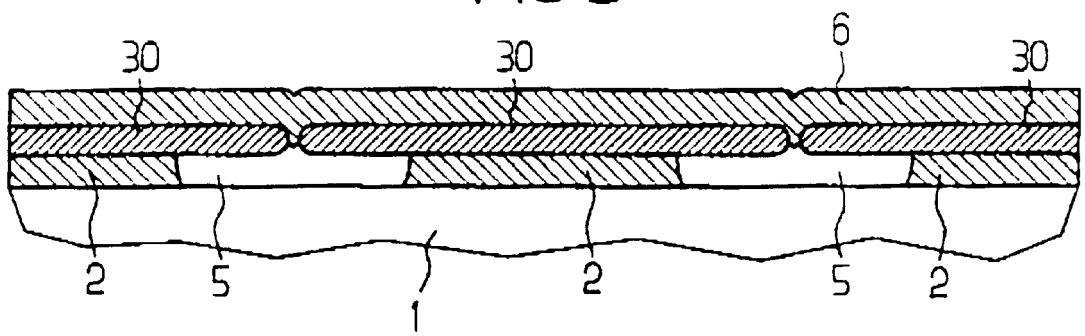
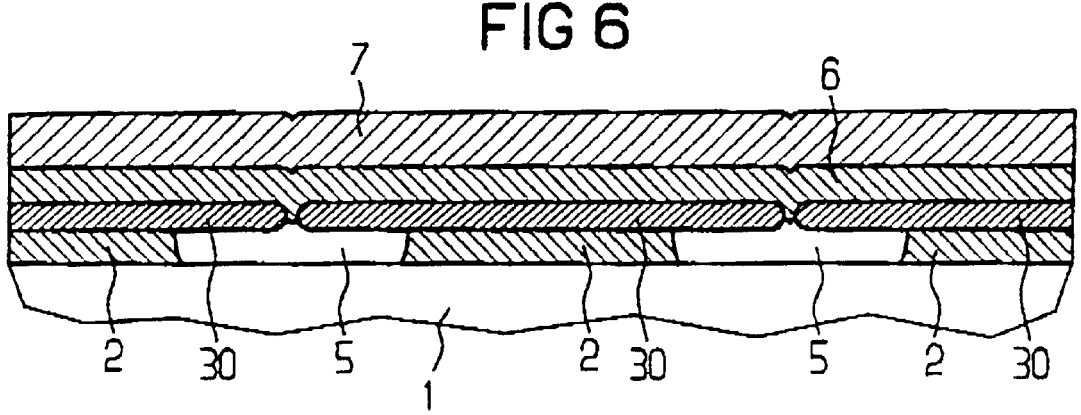
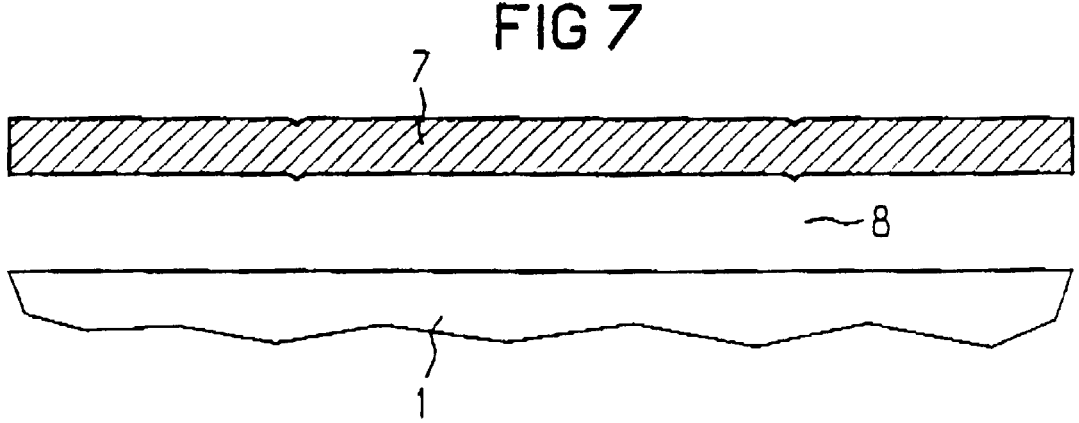

PRODUCTION METHOD FOR MICROMECHANICAL COMPONENTS

CROSS-REFERENCE TO RELATED APPLICATION

This is a continuation of copending International Application PCT/DE99/01337, filed May 4, 1999, which designated the United States.

BACKGROUND OF THE INVENTION

1. Field of the Invention

The present invention relates to a method of producing micromechanical components having a cavity which is etched out in a sacrificial layer.

During the production of micromechanical components which can be produced, for example, in the course of a CMOS process, it is often necessary, for example in the case of pressure sensors, to etch out a cavity in a sacrificial layer under a polysilicon layer provided as a membrane or the like. The etching holes in the polysilicon layer are normally arranged in a grid with a typical hole interval of 5 $\mu$m. Larger intervals lead to unacceptably long etching times and an unacceptably strong etching attack on the layers which are intended to form the structure to be produced and which must be retained. If the etching holes need to be closed, for example in the case of pressure sensors, the sealing materials cause inhomogeneities in the membrane and make the long-term stability of the sensor worse. When such membranes are used as acoustic isolators for bulk acoustic wave resonators, thin, large-area membranes are required on which no additional closure layers may be applied. Underetching radii of more than 10 $\mu$m have until now not been practicable in a silicon/silicon oxide material system.

German published patent application DE 43 36 774 A1 discloses a method for producing micromechanical structures, in which etching openings for underetching the moving micromechanical structure are provided only in its edge region, and in which the underetching process is accelerated by means of channels 15 provided in the sacrificial layer. Before two substrates are connected to produce an SOI substrate, these channels are produced in the insulation layer on the upper face of one of the substrates being used.

SUMMARY OF THE INVENTION

It is accordingly an object of the invention to provide a production method for micromechanical components having a cavity under a membrane layer, which overcomes the above-mentioned disadvantages of the heretofore-known devices and methods of this general type and by means of which the membrane layer can be produced to be sufficiently homogeneous using the conventional etching methods.

With the foregoing and other objects in view there is provided, in accordance with the invention, a production method for a micromechanical component having a membrane layer, at least part of which is arranged above a cavity, the method which comprises:

- in a first step, applying a sacrificial layer to an upper face of a substrate;
- in a second step, applying an auxiliary layer composed of a material with respect to which the sacrificial layer can be selectively etched to the sacrificial layer;
- in a third step, forming openings in the auxiliary layer;
- in a fourth step, etching channels in the sacrificial layer via the openings in the auxiliary layer;
- in a fifth step, applying a planarization layer and closing the openings;
- in a sixth step, applying a membrane layer;
- in a seventh step, forming etching openings in an edge region of the membrane layer; and in an eighth step, removing the,sacrificial layer, the auxiliary layer, and the planarization layer in a region of a cavity to be produced, via the etching openings and the etching channels produced in the fourth step.

In addition, the method 2, may comprise producing the sacrificial layer and the planarization layer from silicon oxide, and producing the auxiliary layer from silicon, and thermally oxidizing the silicon of the auxiliary layer between the fourth step and the fifth step.

The method according to the invention differs from the conventional methods in that etching openings are provided over an etched-out cavity in an edge region in that part of a structure layer which is intended to be used as a functional element, for example as a membrane, and is referred to as standard in the following text as a membrane layer, in which case this edge region, measured from the side wall or boundary of this cavity, is at most one tenth of the diameter of the functional element, for example of the membrane. This ensures that four fifths of the membrane is free of inhomogeneities in any direction running through the center of the membrane.

On the basis of this structure, the component can be produced using the conventional etching methods for producing micromechanical components having a cavity in a sacrificial layer. To this end, a cohesive network composed of cavities in the form of channels is created in the sacrificial layer on which the membrane layer is applied. This is done even before the membrane layer is deposited. After this, etching holes are produced in the said edge region of the membrane layer. The sacrificial layer is removed to the intended extent, with the etching medium propagating through the cavities which are in the form of channels sufficiently quickly that the sacrificial layer is removed over the entire region of the cavity which is to be produced, but the etching attack does not go beyond the intended boundary of the cavity, or even damage the membrane layer. The channel-like cavities can be produced by etching out a sacrificial layer through openings in an auxiliary layer applied to it. Before the membrane layer is deposited, the auxiliary layer is preferably made smooth by means of a planarization layer, by which means the etching openings are also closed.

Other features which are considered as characteristic for the invention are set forth in the appended claims.

Although the invention is illustrated and described herein as embodied in a method of producing micromechanical components, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1A is a partial section taken through a component;

FIG. 1B is a section taken along the line IB—IB in FIG. 1A and viewed from below; and FIGS. 2 to 7 are sectional views taken through intermediate products of a component after various steps in the production method.

DESCRIPTION OF THE PREFERRED EMBODIMENTS

Figure 2:
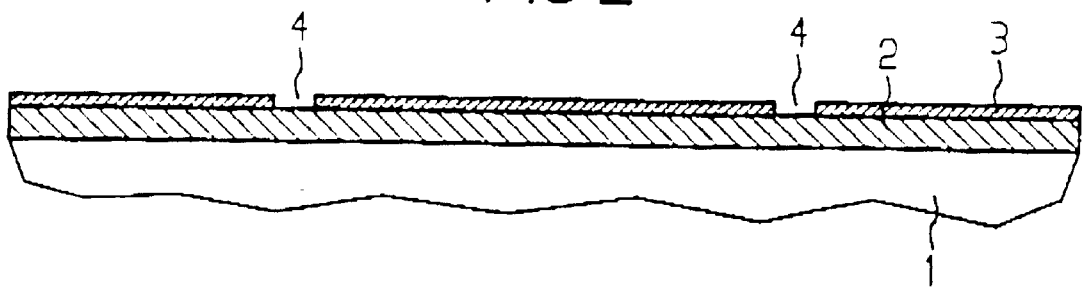

Referring now to the figures of the drawing in detail and first, particularly, to FIG. 1A thereof, there is shown a cross section of a component on a substrate 1 having. a membrane layer 7 above a cavity 8. The cavity is bounded at the side by a remaining part of the sacrificial layer which in this case, owing to a particular production method which is described in the following text with reference to FIGS. 2 to 7, is composed of three layers, namely the sacrificial layer 2, an oxidized auxiliary layer 30, and a planarization layer 6. Etching openings 9 are provided above the cavity 8 in the membrane layer 7, in the edge region of that part which acts as a membrane, and these etching openings 9 can-subsequently be closed by the material of the membrane layer (for example polysilicon) or, for example, by an oxide. A closure layer 10, which is included here as an example, can also be applied over the entire surface, covering and/or filling the etching openings 9.

FIG. 1B shows the section, as shown in FIG. 1A, looking in the direction from underneath toward the membrane. The membrane layer 7 and the (cut) planarization layer 6 all around can be seen. By way of example here, the etching openings 9 are shown on the two narrow sides of the membrane, which in this case is rectangular. However, the membrane may also be round, square or have any other boundary. The edge 60 of the planarization layer 6 defines the edge of the part of the membrane layer 7 which forms the membrane. A dashed circle 16 is shown around an etching opening to indicate the point to which the cavity, which is etched out under this opening, extends assuming the etching medium propagates isotropically in the sacrificial layer, and if the etching attack is intended to be stopped at the edge 60.

In order to allow the component to be produced using a conventional etching method, the sacrificial layer is structured with cavities in the form of channels. This is best done by using $SiO_2$ and polysilicon and by making use of the good etching selectivity between these materials.

Figure 3:
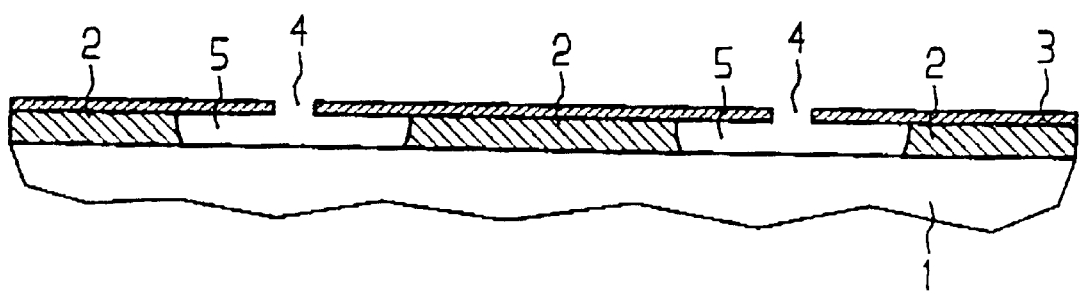

Referring now to FIG. 2, there is shown a cross section of a detail of the substrate 1 under a central region of the cavity which is to be produced. A sacrificial layer 2, preferably composed of silicon oxide, for example TEOS (tetraethylorthosilicate) is applied over the entire surface, or is produced by thermal oxidation of the substrate surface. An auxiliary layer 3 is applied to this sacrificial layer 2, with respect to which auxiliary layer 3 the material of the sacrificial layer can be selectively etched away and which may be, for example, polysilicon, and this auxiliary layer 3 is provided with openings 4. These openings 4 may be, for example, one or more rows of holes or slots. The material of the sacrificial layer 2 is etched out through these rows of holes or slots, so that channels 5 are formed in the sacrificial layer, as shown in FIG. 3. The width of the channels can be varied by means of the etching rate and the etching time.

Figure 4:
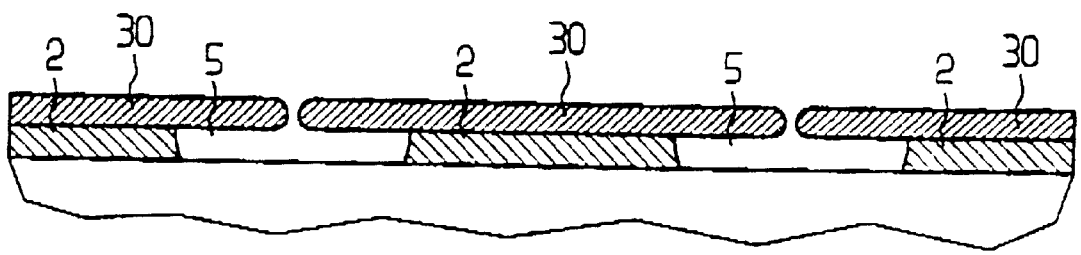

The use of silicon oxide for the sacrificial layer 2 and silicon for the auxiliary layer 3 has the particular advantage that the auxiliary layer 4 can be thermally oxidized in a subsequent step, so that silicon oxide is formed, which can later be removed in the same etching step together with the oxide of the sacrificial layer 2. The thermally oxidized auxiliary layer 30 is shown in FIG. 4, in which case it is also possible to see that the volume of the material of the auxiliary layer becomes considerably larger during the oxidation process.

If this volume enlargement process does not result in the openings 4 being closed, this is done by applying a planarization layer 6 (FIG. 5). If there are particular requirements for the smoothness of the membrane layer to be applied subsequently, a doped oxide is used for the planarization layer 6 and this is made to flow in a subsequent heat-treatment step, that is to say it is additionally made smooth.

The membrane layer 7 is applied as shown in FIG. 6. The etching openings are produced only in the edge region in the membrane layer, although this is not shown in FIGS. 2 to 7. Thus, as shown in FIG. 7, the major proportion of the membrane remains very largely homogeneous. The membrane layer is, for example, polysilicon, which is deposited in the conventional manner. Owing to the channels 5 in the sacrificial layer 2 and the comparatively small thickness of the (possibly oxidized) auxiliary layer 3, 30 and of the planarization layer 6, the etching medium (or, if different materials are used for said layers, a number of etching media are also required) is distributed sufficiently quickly throughout the entire region of the membrane. The complete cavity which is provided can thus be etched out in a short time using a small number of etching openings in the edge region, thus resulting in the component produced according to the invention with a membrane which is very largely homogeneous formed over the cavity.

In summary, the advantages of the invention can be quoted as follows. Before the membrane layer is deposited in the sacrificial layer, a cohesive network composed of cavities in the form of channels is created by a small number of additional steps in an otherwise conventional process, so that only a very small number of access openings, which are created at the sides, are required in the membrane layer for the etching medium. These openings can be created wherever any closure layers to be applied subsequently will have no negative influence on the operation of the membrane. If, as is preferred, silicon oxide is used for the material of the sacrificial layer, the channels result in the (liquid) etching medium being distributed very quickly throughout the entire region to be etched free, owing to the hydrophilic nature of this oxide. The effective length of the front of the etching attack can thus be increased considerably, and the volume etched per unit time rises correspondingly drastically. The etching time is thus virtually independent of the distance from the etching opening, since the progress of the etching process is limited only by the reaction rate and not by the diffusion time. With a typical interval between the channels of 10 μm, virtually any desired structures can be etched free in an acceptable time in micromechanical components having typical dimensions. Further advantages also result from the fact that the direction of the underetching can be controlled by arranging the etching channels in a suitable manner.

We claim:

1. A production method for a micromechanical component having a membrane layer, at least part of which is arranged above a cavity, the method which comprises:
   in a first step, applying a sacrificial layer to an upper face of a substrate;
   in a second step, applying an auxiliary layer composed of a material with respect to which the sacrificial layer can be selectively etched to the sacrificial layer;
   in a third step, forming openings in the auxiliary layer;
   in a fourth step, etching channels in the sacrificial layer via the openings in the auxiliary layer;

in a fifth step, applying a planarization layer and closing the openings;

in a sixth step, applying a membrane layer;

in a seventh step, forming etching openings in an edge region of the membrane layer; and in an eighth step, removing the sacrificial layer, the auxiliary layer, and the planarization layer in a region of a cavity to be produced, via the etching openings and the etching channels produced in the fourth step.

2. The method according to claim 1, which comprises producing the sacrificial layer and the planarization layer from silicon oxide, and producing the auxiliary layer from silicon, and thermally oxidizing the silicon of the auxiliary layer between the fourth step and the fifth step.

3. A method of producing a micromechanical component, the method which comprises:

applying a sacrificial layer to an upper face of a substrate;

depositing an auxiliary layer on the sacrificial layer, wherein the auxiliary layer is composed of a material with respect to which the sacrificial layer can be selectively etched;

forming openings in the auxiliary layer;

etching channels in the sacrificial layer via the openings in the auxiliary layer;

depositing a planarization layer and closing the openings in the auxiliary layer;

applying a membrane layer;

forming etching openings in an edge region of the membrane layer; and removing the sacrificial layer, the auxiliary layer, and the planarization layer in a region of a cavity to be produced, via the etching openings and the etching channels in the auxiliary layer.

* * * * *